United States Patent [19]
Malmin

[11] 3,713,221
[45] Jan. 30, 1973

[54] ROOT CANAL INSTRUMENT

[76] Inventor: Oscar Malmin, 127 E. Wayne St., Akron, Ohio 44301

[22] Filed: June 9, 1971

[21] Appl. No.: 151,475

[52] U.S. Cl. .................................................32/57
[51] Int. Cl. ..............................................A61c 3/08
[58] Field of Search ...................................32/57, 59

[56] References Cited

UNITED STATES PATENTS

| | | | |
|---|---|---|---|
| 3,562,913 | 2/1971 | Saffro | 32/57 |
| 1,366,877 | 1/1921 | Craig | 32/57 X |

Primary Examiner—Robert Peshock
Attorney—Freeman & Taylor

[57] ABSTRACT

A dental instrument for root canal preparation including a hollow plastic sleeve having opposed open ends and an enlarged central area which can receive the head of a conventional reamer while its cutting end projects from one of the open ends thereof. The sleeve also has a series of gradations in the form of circumferential grooves on its outer surface to enable it to be accurately cut off to any desired length. The sleeve is also adapted to be used with a variety of handles including an axially extending handle for anterior use and a right angle handle for posterior use.

11 Claims, 14 Drawing Figures

PATENTED JAN 30 1973 3,713,221

INVENTOR.
OSCAR MALMIN
BY Freeman & Taylor
ATTORNEYS

PATENTED JAN 30 1973 3,713,221

INVENTOR.
OSCAR MALMIN
BY Freeman + Taylor
ATTORNEYS

INVENTOR.
OSCAR MALMIN

BY Freeman & Taylor

ATTORNEYS

ROOT CANAL INSTRUMENT

BACKGROUND OF THE INVENTION

The invention relates in general to dental tools and in particular relates to reamers and files which are utilized in preparing the root canals of teeth. The present invention has particular utility in enabling the user to control the depth to which the reamer will ultimately be inserted into the canal. It also provides improved handling characteristics due to its interchangability with a variety of handles depending upon whether an anterior or posterior application is involved.

In the field of dentistry, it is a common practice to utilize metal reamers for opening root canals. These reamers usually have a working or cutting head and a gripping head interconnected by a shank. In a normal method of operation, the gripping head has a roughened surface and is held between the thumb and forefinger of the user and rotated into and out of the root canal.

The objective of this operation is to determine and control the depth to which the reamer is inserted. This is commonly accomplished by placing a movable marker on the shank of the reamer or file, placing the instrument into the canal, moving the marker in contact with an anatomical landmark on the surface of the tooth, and taking an X-ray to determine the relationship of the tip of the instrument to the apex of the root. Once the correct instrument length has been determined, the succeeding instruments must be "stopped" from penetrating to any depth greater than determined as ideal by the operator. Previous methods have been disadvantageous either because the "stops" are displaceable in usage or are time-consuming and costly in utilizing prefabricated lengths. Neither do these methods add protection for the patient.

The present method of gripping the tool is also somewhat unsatisfactory unless a rubber dam is used because of the danger of the tool slipping from the grasp of the user and being swallowed or aspirated by the patient. Furthermore, in the normal operation, irrigation with solutions that are irritating to the skin is directed into the tooth being worked on with the consequent result that the user's hands suffer skin damage from being in contact with the solution. Both problems are due to the size of the working handle.

DESCRIPTION OF THE PRIOR ART

The following patent prior art is known to Applicant:
Chiavaro U.S. Pat. No. 649,234
Gray U.S. Pat. No. 797,106
Skalstad U.S. Pat. No. 873,100
Rosenthal U.S. Pat. No. 1,035,239
Fernald U.S. Pat. No. 1,170,523
Ebenreiter U.S. Pat. No. 1,198,628
Bolls U.S. Pat. No. 1,356,755
Craig U.S. Pat. No. 1,366,877
Pearl U.S. Pat. No. 1,368,195
Gilbert U.S. Pat. No. 1,404,519
Vosbikian et al. U.S. Pat. No. 3,375,860

The above listed art describes various dental tools, none of which, however, disclose a sleeve of the type disclosed by Applicant and none of which disclose the novel handle means.

Applicant is also aware of a method of controlling the depth to which the reamer is inserted into the tooth by using stops, and this method is described in detail above. Magnetized collars of various lengths are also sometimes utilized. All of these methods require the storing and using of a large number of small pieces which are easily confused, misplaced or disorganized.

SUMMARY OF THE INVENTION

It has been discovered that a simple economic, yet efficient device can be provided by simply providing a hollow plastic sleeve having opposed open ends and an enlarged central cavity. The reamer can be inserted into the sleeve and held in place due to its inherent resiliency, with the gripping portion of the reamer being received in the central cavity and the cutting head projecting beyond one opposed end of the sleeve. It has been found that if the sleeve has gradations or indicia marked on its outside that once the depth of the root canal has been ascertained, it is merely necessary to cut off the end of the sleeve at the desired point so that when the tip of the reamer has reached the desired depth, the end of the sleeve will bottom on the tooth and the operator will know that he has penetrated to the desired depth. In this regard, if the gradations or indicia take the form of circumferential slits accuracy can be assured in the cutting operation.

It has also been discovered that if the opposed end of the sleeve has an opening therein that an elongate handle can be snapped into place in axially projecting condition to thereby increase the leverage available to the user and provide a better gripping area. This type of handle connection has been found to be of particular utility with regard to the anterior or front teeth.

Furthermore, it has been discovered that by providing a recessed annular groove on the external surface body of the sleeve that a spring like gripping member can be placed about the sleeve and seated in the groove to provide better leverage and ease of operation when dealing with the posterior or back teeth.

Accordingly, production of an improved dental tool having the above noted characteristics becomes the principal object of this invention with other objects thereof becoming more apparent upon a reading of the following brief specification considered and interpreted in view of the accompanying drawings.

DESCRIPTION OF THE PREFERRED EMBODIMENTS

Figures 1, 2:
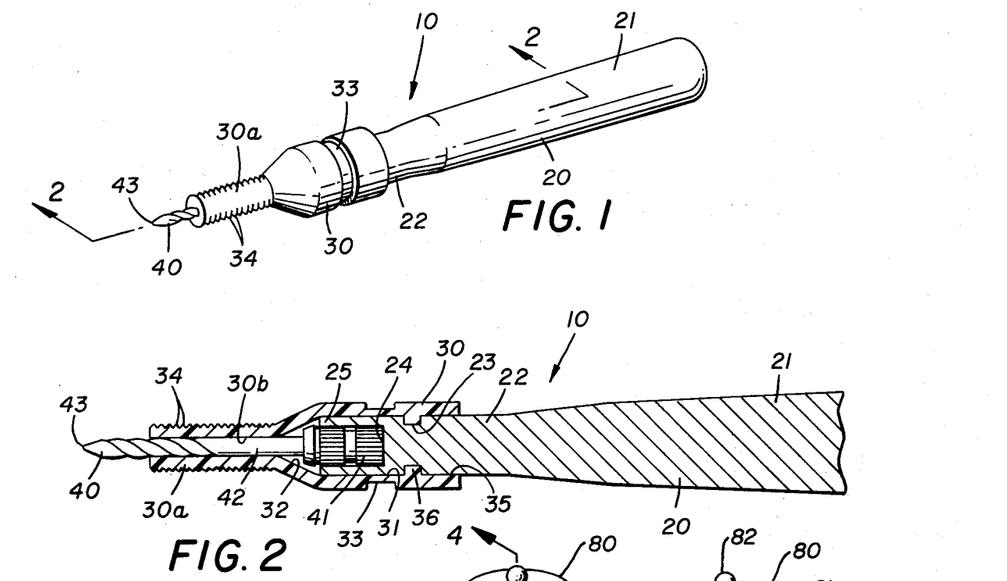
FIG. 1 is a perspective view of the assembled tool showing the handle utilized in the anterior operation.
FIG. 2 is a longitudinal sectional view of FIG. 1 taken along the lines 2—2 thereof.

Considering first then FIG. 1 for a general description of the tool 10, it will be seen that the same includes a handle 20, a sleeve 30, and a reamer 40.

The handle 20 in the form of the invention shown in FIGS. 1 and 2 is made of plastic or other suitable material, rigid or semi-rigid, and is elongate in nature having a gripping area 21 and a narrowed or tapering front end 22 which connects with the sleeve 30 as clearly shown in FIGS. 1 and 2 and described below.

In this regard, the end 22 of handle 20 tapers from gripping portion 21 and has a circumferential groove 23 on its outer surface. This end of the handle also has a counter bore 24 therein forming an open end with a pocket bounded by lip 25 for reception of the head of the reamer 40 as will be subsequently described.

Turning next to the sleeve 30, the same includes a hollowed out central portion 31 which tapers as at 32 for complemental engagement with the reamer 40 as will be described in greater detail below. The sleeve 30 also has an annular groove 33 in its central area and has an elongate shank 30a with a through bore 30b and upon which a series of gradations or indicia 34,34 are provided. In this regard, these gradations will normally be in millimeters and half millimeters, but the invention is not intended to be limited to any particular unit of measurement.

It should be noted that in the preferred form of the invention the gradations or indicia 34,34 will be in the form of circumferential grooves to facilitate accurate cutting as will be described.

Finally, sleeve 30 has an open end 35 which has an internal rib 36 and, due to the fact that the sleeve is generally made of plastic or similarly resilient material, can receive the end 22 of handle 20 by merely being snapped onto the handle.

The reamer itself, generally indicated by the numeral 40, will be seen to have a gripping head 41, a shank 42 projecting therefrom, and a cutting tip 43 and is of conventional well known construction. In this regard, a reamer is illustrated, but it should be understood that the invention has equal utility with other instruments, such as files, for example.

In assembling the tool, attention is called to FIG. 2 wherein it will be seen that the reamer 40 is inserted into the sleeve 30 so that its head 41 seats in the tapered area 32 with shank 42 passing through the opening bore 30b in the shank 30a so that the cutting tip 43 projects beyond the end of the shank. The handle 20 can then have its end 22 snapped into the end 36 of the sleeve and the tool is in operative condition.

In this regard, due to the natural resiliency of sleeve 30, the same can be stretched to allow the lip 25 of the handle to penetrate the sleeve and engage head 41 of reamer 40. Also, groove 23 of the handle will engage rib 36 to securely hold the components in place.

In actual use, an X-ray will have been taken before the tool was assembled showing the depth of the root canal. It is then a simple matter to compute the distance between the top of the tooth and the bottom of the canal, with this distance being the distance to which the tip 43 of reamer 40 is to penetrate. Accordingly then, in order to utilize the present invention, it is merely necessary to cut off such a portion of the shank 30a as will enable the distance from the end of the cutting tip 43 to the end of the shank 30a to equal the distance from the top of the tooth to the bottom of the root canal. Following this, as the reamer 40 is driven into the canal when the tool has penetrated this distance, the end of the shank 30a will bottom on the tooth and the user will then know that the canal has been excavated to the desired depth.

Figure 3:
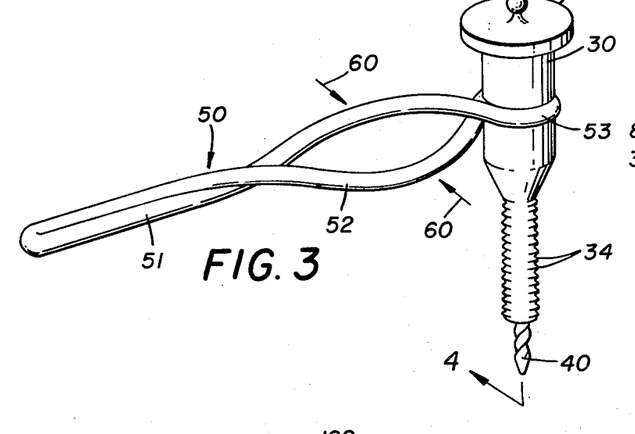
FIG. 3 is a perspective view of the improved tool showing the handle utilized in the posterior operation, in place, on the sleeve.
Figure 4:
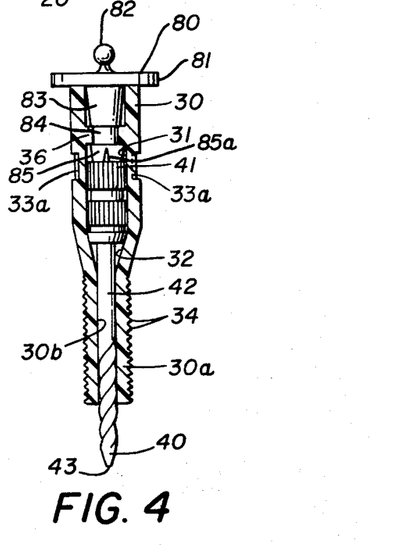
FIG. 4 is a sectional view of the sleeve and reamer taken along the lines 4—4 of FIG. 3 showing a modified sleeve.

In the form of the invention shown in FIGS. 3 and 4, the same sleeve 30 and reamer 40 are utilized, with it being understood that the depth of penetration is controlled in the same manner as above set forth with regard to the form of the invention shown in FIGS. 1 and 2.

However, the handle 20 utilized in FIGS. 1 and 2 is primarily for use in the anterior or front teeth where the user has a relatively large amount of space to work in. It is believed apparent that when dealing with the rear or posterior teeth that the handle 20 would not be suitable.

Accordingly then and referring to FIG. 3, a unique type handle 50 has been provided, with this handle being constructed of an endless piece of relatively resilient metal and having a gripping portion 51, a first loop portion 52, and a second loop portion 53. In operation, the first loop portion 52 merely needs to be squeezed together in the direction of the arrows 60,60 to enable the second loop portion 53 to be slightly enlarged. This makes it possible to engage the second loop portion 53 with the annular groove 33 on the sleeve 30. Release of the pressure on the second loop 53 insures a firm connection between the handle 50 and the sleeve 30. At this time, it is merely necessary to grasp the gripping portion 51 and work the tool back and forth into the root canal. As pointed out above, the correct depth of penetration will be ascertained in the same fashion as set forth with regard to the form of the invention shown in FIGS. 1 and 2.

Optionally, the annular groove 33 of the sleeve 30 can be provided with a series of serrations 33a. These serrations will improve the gripping ability of the handle 50 and the handle can either be utilized in a simple frictional engagement with the sleeve or with improved gripping properties provided by the serrations. The loop 53 can also be provided with complemental serrations 53a if desired.

In this form of the invention a cap 80 is employed to securely lock the reamer 40 in place in the sleeve 30.

Referring to FIGS. 3 and 4, it will be noted that the cap 80 has a projecting knob 82 and a circular top piece 81. Depending from the top piece 81 is a cylindrical body member 83 which has a reduced diameter Portion 84 and an end portion 85. The end portion 85 is slit as at 85a. In assembling the tool, this cap is snapped into place in the top end of the sleeve 30, with the reduced diameter portion 84 contacting the rib 36 of the sleeve to securely hold the cap 80 in place. The end portion 85 also engages the handle 41 of the reamer 40, with the slit 85a permitting it to be snapped around the head 41 to securely hold the reamer in place.

Figure 5:
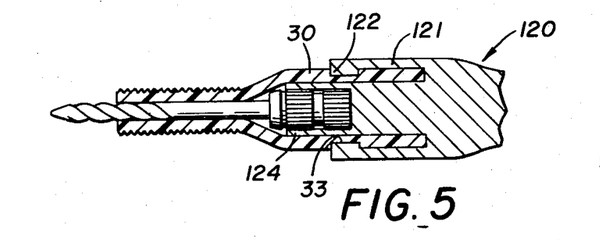
FIG. 5 is a partial sectional view similar to FIG. 2 but showing a modified handle for use in the anterior operation.
Figure 6:
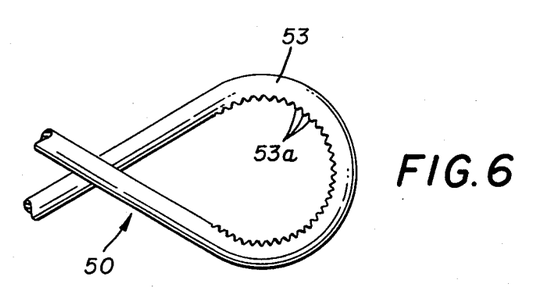
FIG. 6 is a planar view of the handle 50 showing a modified construction of the loop 53.

Turning next then in FIG. 5, a modified handle 120 adapted for use in the anterior method is disclosed. The basic difference between handle 120 and handle 20 is that the handle 120 engages the sleeve 30 on the outside rather than on the inside. In this regard, it will be seen from FIG. 5 that instead of tapering toward the end 22, the handle actually is enlarged to provide an annular collar 121 with a return flange 122 on its outboard end. This flange will engage the groove 33 of sleeve 30 to firmly hold the handle with regard to the sleeve. A similar pocket is formed on the handle 120 consisting of the lip 124 which engages the head 41 of the reamer 40 as described above. To facilitate assembly of this handle, the rib 36 of the sleeve 30 may be eliminated.

Figure 7:
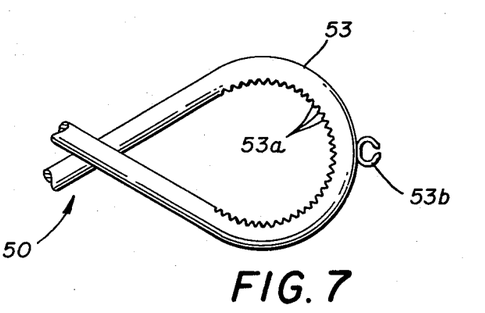
FIG. 7 is a planar view of handle 50 showing still further modification.
Figure 8:
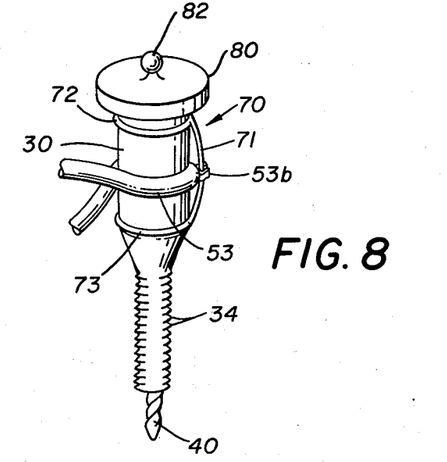
FIG. 8 is a perspective view showing an improved type of safety clip interconnecting handle 50 and sleeve 30.

Considering the form of the invention shown in FIGS. 7 and 8, which has relation to the posterior operation, an improved safety clip 70 has been disclosed.

While unlikely, it is possible for the loop 53 to be disengaged from the sleeve 30, in which event the risk of the patient swallowing or aspirating the sleeve does exist. In order to prevent this, a safety clip 70 is provided with this clip having a shank 71 and a pair of opposed loops 72 and 73. These loops have an internal diameter only slightly greater than the external diameter of the sleeve and are intended to fit snugly as will now be described. Furthermore, a loop 53 of the handle 50 has a clip 53b disposed thereon.

In using this form of the invention, assembly may be accomplished by engaging the handle 50 with the sleeve 30 as described above. Bottom loop 73 of clip 70 is then slipped over the bottom of the sleeve and the shank 71 is engaged with the clip 53b, followed by slipping loop 72 over the top of the sleeve. In this fashion, even if the loop 53 is inadvertently expanded, the sleeve cannot slip out and become lost. Furthermore, due to the fact that the shank 71 is freely journaled within clip 53b the tool can be rotated in the manner described above.

Turning next then to FIGS. 9 through 12, a still further modification of the invention is disclosed.

This form of the invention, generally indicated by the numeral 210 includes a reamer or broach 240, a combined handle and stop member 250, a tool holder 260 and an expansion screw 270.

Figure 9:
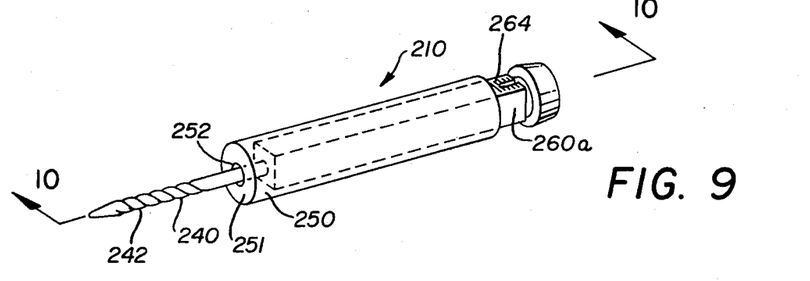
FIG. 9 is a perspective view showing a further modified form of the invention.
Figure 10:
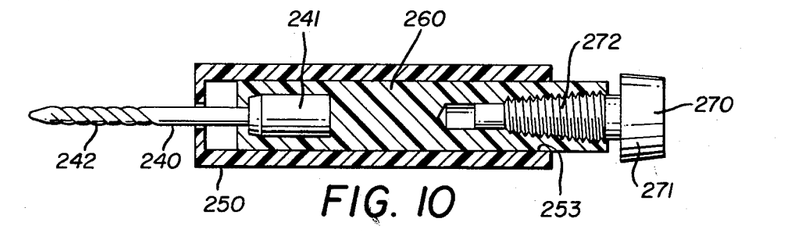
FIG. 10 is a sectional view of the tool of FIG. 9 taken along the lines 9—9 thereof.
Figure 11:
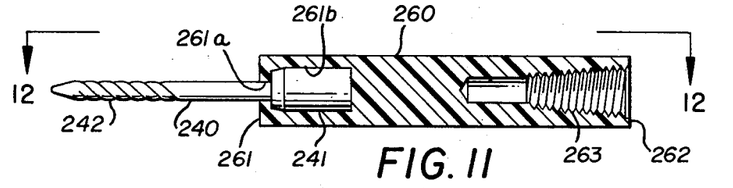
FIG. 11 is a sectional view of the instrument holder of FIG. 9.
Figure 12:
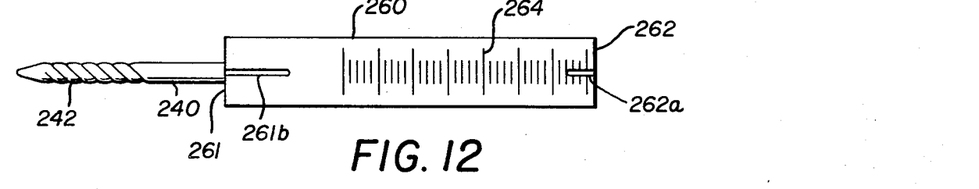
FIG. 12 is a view of the holder of FIG. 11 taken along the lines 12—12 thereof.

FIGS. 9 and 10 show these components in assembled condition, while FIGS. 11 and 12 show the reamer 240 in position in the holder 260.

Considering first then FIGS. 11 and 12, it will be seen that the reamer 240 is similar to the reamer disclosed and described with regard to the forms of the invention shown in FIGS. 1 through 8 and consists of an enlarged head 241 and shank 242 which performs the cutting action.

The holder 260 is generally elongate and has at least one flat side such as 260a. In this regard, the form of the modification shown in FIGS. 9 through 12 illustrates the holder as being square or rectangular in cross section, but the cross section of the holder could be of any desired configuration although it will become apparent subsequently that at least one flat surface is desirable to facilitate gripping by the operator and prevent relative rotation between holder 260 and handle 250.

Continuing then with the description of the holder 260, it will be seen that the same has opposed ends 261 and 262. The end 261 has a through aperture 261a which is somewhat larger than the outer diameter of the shank of the reamer. This aperture terminates in an enlarged pocket 261b which receives the reamer head 241 as will be described below. The handle 260 further has a pair of opposed axial slits 261b,261b, only one of which is shown in FIG. 12, extending inwardly from end 261. It is contemplated that the holder will be made of plastic or a similar material capable of some expansion so that the head 241 of the reamer 240 can be snapped into place inside the holder with the slits 261b,261b facilitating this operation. Once the reamer has been snapped into place, the natural resiliency of the holder will tend to hold it there.

The opposed end 262 of holder 260 also has axial slots 262a,262a only one of which is shown in FIG. 12, and an inwardly extending tapered threaded bore 263. Finally, the holder has a series of gradations or markings thereon identified by the numeral 264.

Turning next then to the combined hollow handle and stop member 250, it will first be noted that the same will have interior configuration corresponding to the external configuration of the holder 260. This handle 250 is made of a flexible, light weight material capable of being telescoped over the holder with its natural resiliency tending to hold the same in place. A through bore 252 is located in the closed end 251 of the handle to permit the shank of the reamer 240 to project therethrough. The opposed end 253 of handle 250 is open for purposes which will be described below.

To further assist in holding the handle in place on the holder, a tapered, threaded screw 270 having a head 271 and a tapered shank 272 is provided and is adapted to be threaded into the tapered, threaded bore 262 in the holder 260. This will cause a bulging or expansion of the holder adjacent its end 262 and will serve to firmly hold the handle 250 in place. The slots 262a,262a assist in this by facilitating expansion of the holder upon insertion of screw 270.

In use or operation of the modified form of the invention shown in FIGS. 9 through 12, it will first be assumed that the length of the reamer is known. It will also be assumed that the desired depth of penetration into the tooth is also known. At this time and assuming a given length to the handle, the handle is slipped onto the holder 260 with open end 253 aligned with the desired indicia. Assuming that the reamer has already been inserted into the handle, it is then merely necessary to apply the locking screw 270 to firmly fix the holder in place. At this time the user begins the reaming operation, and when the end 251 of the handle strikes a reference point on the tooth, the reamer will have been inserted to the necessary depth.

Figure 13:
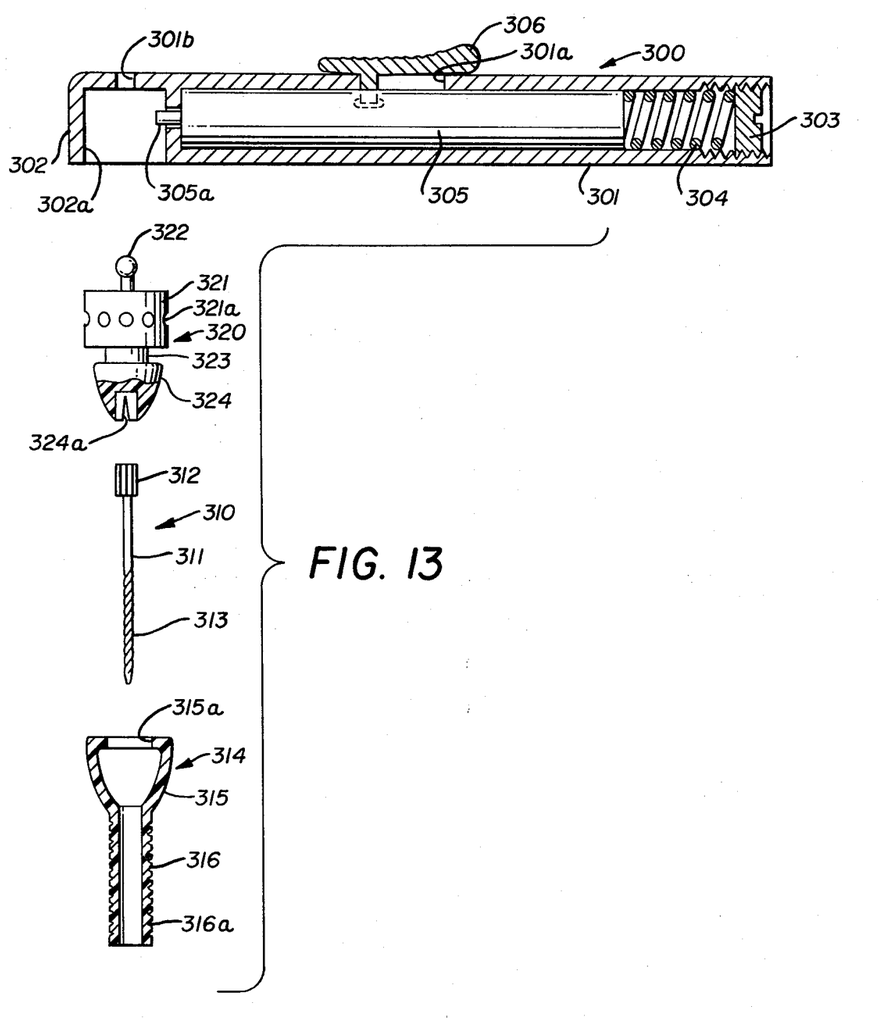
FIG. 13 is an exploded sectional view of a modified form of the invention including a modified operating handle.

Turning next then to FIG. 13, a still further modification is disclosed. This combination includes the reamer 310, the sleeve 314, a cap 320, and a handle 300.

The reamer 310 is conventional, having a head 312, a shank 311, and the normal operative portion 313.

The sleeve 314 is similar to the sleeves earlier discussed in that it is a resilient material and includes an enlarged top portion 315 which has an opening in it 315a and a shank portion 316 with a series of annular notches 316a for measurement purposes as described above.

The cap 320 includes an enlarged head portion 321 having a series of peripheral openings 321a therein. The cap also includes a knob 322 projecting upwardly, a reduced diameter portion 323, and a bottom section 324 which is notched as at 324a.

In assembling this form of the invention, the reamer 310 is placed in the sleeve 314 and then the cap 320 is inserted into the sleeve 314. The notching of the bottom portion 324 will permit that portion to engage the head 312 of the reamer thereby holding it securely in place.

Turning next then to the operative handle 300, it will be noted that this is an elongate piece having a main body portion 301 and a head portion 302. Head portion 302 is hollowed as at 302a and has a top opening 301b. Also in the top wall of the body 301 is an opening 301a.

Received within the body 301 is a cylindrical member 305 with a projection 305a on one end thereof. Also received within the body 301 is a spring 304 which is held in place by a cap 303 which is screwed into the body 301 as clearly shown in FIG. 13.

A thumb-operated lever 306 is provided, with this lever being connected to the cylindrical member 305 so that upon movement of the lever 306 to the right of FIG. 13, for example, the cylindrical member 305 will be retracted against the force of the spring 304.

Assuming that the cap 320, reamer 310, and sleeve 314 have been assembled as described above, it is merely necessary to retract the cylindrical member 305 and insert the cap into the opening 302a. The knob 322 will pass through the opening 301b thereby locating the assembled device with regard to the handle 300. Upon release of the lever 306, the projection 305a will engage one of the openings 321a in the head 321 of the cap 320. In this fashion the assembled instrument is held in position, and the operator can then perform the reaming operation by using the handle 301 in much the same fashion as was done with regard to the handle 50 shown in FIG. 3.

Figure 14:
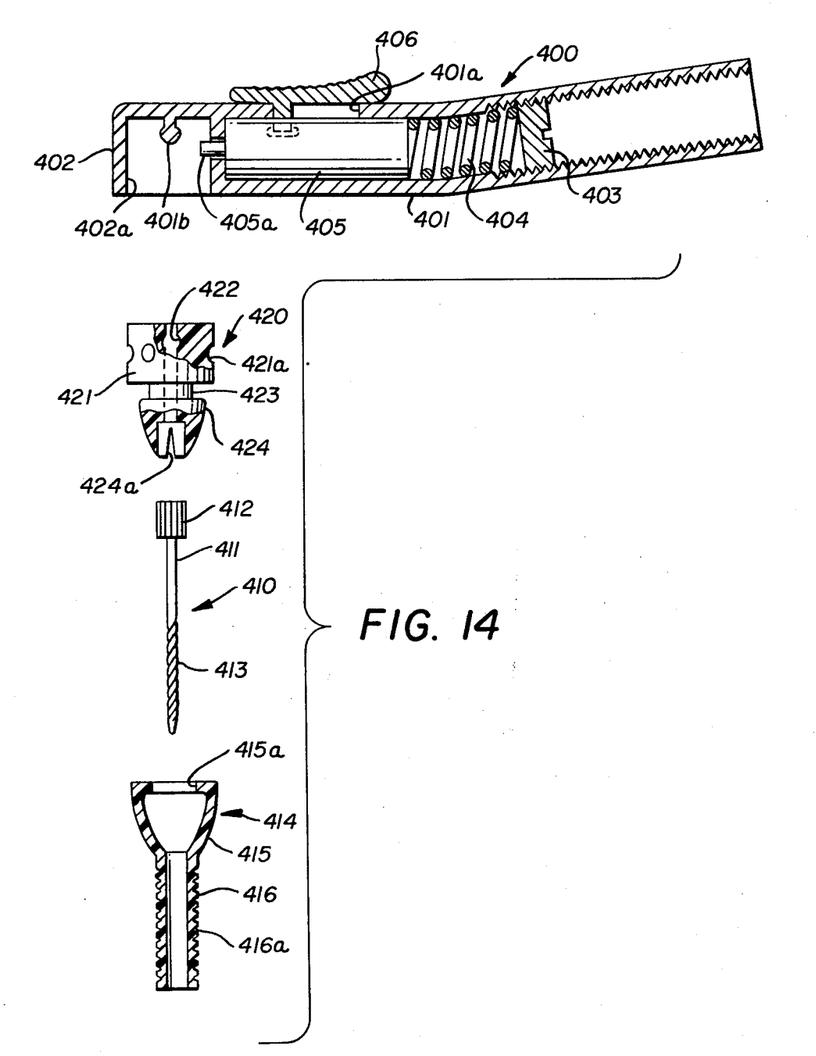
FIG. 14 is a view similar to FIG. 13 showing a still further modified form of the invention.

Turning next then to FIG. 14, a still further modification is shown. In this form of the invention again the reamer 410 is provided with a head or handle area 412, a shank 411, and an operative portion 413.

The sleeve 414 is similar to that shown in FIG. 13 in that it includes a top portion 415 having an opening 415a, a shank portion 416, and a plurality of annular notches 416a. The reamer 410 is received in this sleeve in the same fashion as described above with regard to the form of the invention shown in FIG. 13.

The cap 420 is also similar with one difference. Thus the cap has an enlarged top portion 421, a reduced diameter portion 423, and a bottom portion 424 having slits 424a therein. The top portion 421 also has a series of peripheral holes 421a therein, but instead of the knob 322, this form of the invention has an opening 422 in the top for purposes which will be described below.

Turning to the handle 400, it will be noted that it has a body 401, a cylindrical member 405 with a projection 405a thereon, the lever 406 and a spring 404 which is held in place by the cap 403. In this form of the invention the handle 400 has the rear portion of the body projecting at an angle from the main portion of the body. This facilitates use of the handle by the operator, and it has been found that this configuration gives improved comfort to the user.

The body 401 also has the opening 402a in the end 402, but instead of the opening in the top 301b in the form of the invention shown in FIG. 13, this form has a projecting member 401b. In operation of this form of the invention, the cap 420, reamer 410, and sleeve 414 are assembled as described above. Following this, the assembled device is inserted into the opening 402a, with the projection 401b being received in the opening 422 in the cap 420. The cylinder 405 and lever 406 operate identically so that the projection 405a is received in the apertures 421a of the cap 420.

It is submitted therefore that a simple, yet efficient and economical method and apparatus for ascertaining the correct depth of penetration in the root canal has been discovered and, furthermore, that the sleeve disclosed is adaptable to use with equal facility with regard to either the anterior or posterior teeth.

While a full and complete description of the invention has been set forth in accordance with the dictates of the Patent Statutes, it is believed apparent that modifications can be resorted to without departing from the spirit hereof or the scope of the appended claims.

What is claimed is:

1. A dental tool of the character described, comprising;
    A. a hollow elongate resilient sleeve having a first end and a second end with an enlarged central opening;
    B. an instrument having
        1. a head
        2. a cutting end and
        3. a shank interconnecting said head and said cutting end
        4. with said instrument being adapted to be seated within said sleeve with said cutting end projecting from said first end thereof and said head being received in said enlarged opening of said second end and interlocking with said sleeve;
    C. a series of indicia carried on the external surface of said sleeve whereby said sleeve may be severed at a predetermined point to achieve a desired length; and
    D. handle means adapted to engage said second end of said sleeve.

2. The device of claim 1 further characterized by the fact that said indicia on said sleeve are in the form of circumferential slits whereby said sleeve may be accurately shortened.

3. The device of claim 1 further characterized by the fact that
    A. said sleeve has an inwardly extending rib disposed adjacent said second end; and B. said handle means having a complemental groove thereon
1. whereby said handle means may engage said sleeve and said head of said instrument.

4. The device of claim 1 further characterized by the fact that
A. said sleeve has a circumferential groove on its external surface;
B. said handle means having a radially extending flange thereon
1. whereby said handle means may engage said sleeve; and
C. said handle means having a projecting lip insertable in said second end of said sleeve and adapted to engage said head of said instrument.

5. The device of claim 1 further characterized by the fact that
A. said sleeve has a circumferential groove on its external surface;
B. said handle means including a spring loaded gripping member adapted to engage said groove.

6. The device of claim 5 further characterized by the presence of a series of serrations on at least a portion of said gripping member.

7. The device of claim 1 further characterized by the presence of safety means adapted to interlock said handle and said sleeve.

8. The device of claim 7 further characterized by the fact that said safety means include
A. a clip adapted to engage said sleeve adjacent its first and second ends; and
B. means carried by said handle and adapted to releasably engage said clip.

9. The device of claim 1 further characterized by the presence of means for locking said instrument in said sleeve.

10. A dental tool system comprising;
A. a hollow, elongate sleeve having
1. first and second ends and
2. a plurality of annular grooves in its peripheral surface;
B. an instrument having
1. a head
2. a cutting end and
3. a shank interconnecting said cutting end and said head,
4. with said instrument being adapted to seat within said sleeve with its cutting end projecting from the first end thereof;
C. a cap member
1. adapted to be partially received in said second end of said sleeve and engage said head of said instrument; and
D. a handle
1. adapted to releasably engage said cap member.

11. A sleeve for use with a dental root canal excavating tool having a head, a cutting end and an interconnecting shank, comprising;
A. a hollow, elongate, resilient sleeve having
1. an enlarged central cavity adapted to receive the head of said tool and interlock therewith
2. a through bore communicating with said central cavity and adapted to receive the shank of said tool and
3. means for controlling the distance from the end of said sleeve to the cutting end of said tool whereby said sleeve may be accurately shortened to a predetermined length.

* * * * *